(12) United States Patent
Oddsen, Jr.

(10) Patent No.: US 7,472,458 B2
(45) Date of Patent: Jan. 6, 2009

(54) TILTER APPARATUS FOR ELECTRONIC DEVICE HAVING BIAS ASSEMBLY

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 10/461,637

(22) Filed: Jun. 13, 2003

(65) Prior Publication Data

US 2004/0251389 A1    Dec. 16, 2004

(51) Int. Cl.
E05D 7/10 (2006.01)
E05D 7/12 (2006.01)

(52) U.S. Cl. .............................. 16/255; 16/264; 16/333; 16/334; 248/176.1; 248/274.1; 248/917; 248/923

(58) Field of Classification Search ............ 248/292.13, 248/297.11, 292.11, 280.11, 297.1, 917–923, 248/274.1, 176.1; 40/606, 608; 16/258, 16/261, 264, 255, 333, 342
See application file for complete search history.

(56) References Cited

U.S. PATENT DOCUMENTS

| | | | |
|---|---|---|---|
| 3,463,520 A | 8/1969 | Turro | |
| 3,822,848 A | 7/1974 | Hopkins | |
| 3,862,734 A | 1/1975 | Buchin et al. | |
| 4,447,031 A * | 5/1984 | Souder et al. | 248/281.11 |
| 4,516,751 A | 5/1985 | Westbrook | |
| 4,768,744 A * | 9/1988 | Leeds et al. | 248/280.11 |
| 4,774,961 A | 10/1988 | Carr | |
| 4,836,478 A | 6/1989 | Sweere | |
| 4,944,481 A | 7/1990 | Yurchenco | |
| 5,007,608 A | 4/1991 | Carroll, Jr. | |
| 5,183,162 A | 2/1993 | Ritzenthaler | |
| 5,231,734 A | 8/1993 | Rude | |
| 5,240,215 A | 8/1993 | Moore | |
| 5,240,218 A | 8/1993 | Dye | |
| 5,435,515 A * | 7/1995 | DiGiulio et al. | 248/576 |
| 5,503,491 A * | 4/1996 | Lu | 403/86 |
| 5,566,048 A | 10/1996 | Esterberg et al. | |
| 5,570,498 A * | 11/1996 | Hipkiss et al. | 16/258 |
| 5,799,917 A * | 9/1998 | Li | 248/284.1 |
| 5,894,633 A * | 4/1999 | Kaneko | 16/306 |
| 6,019,332 A * | 2/2000 | Sweere et al. | 248/284.1 |
| 6,092,264 A | 7/2000 | Banks | |
| 6,189,849 B1 | 2/2001 | Sweere et al. | |
| 6,286,794 B1 | 9/2001 | Harbin | |
| 6,347,433 B1 * | 2/2002 | Novin et al. | 16/367 |
| 6,354,549 B2 * | 3/2002 | Sweere et al. | 248/292.14 |
| 6,488,599 B2 * | 12/2002 | Nye | 473/483 |
| 6,530,122 B1 * | 3/2003 | Kondou et al. | 16/335 |
| 6,532,628 B2 | 3/2003 | Kim et al. | |
| 6,584,646 B2 | 7/2003 | Fujita et al. | |

(Continued)

Primary Examiner—Amy J. Sterling
(74) Attorney, Agent, or Firm—Lerner, David, Littenberg, Krumholz & Mentlik, LLP

(57) ABSTRACT

A tilter assembly is provided for positioning an electronic device such as a flat panel display. The tilter assembly includes a tilter shaft holder having an opening aligned along an axis and a shaft received within the opening. The shaft is rotatable about the axis, and may be coupled to a support. The tilter shaft holder is coupled to the electronic device. The tilter assembly also includes a spring device in operative association with the shaft to provide a bias or counterbalance to the electronic device, thereby preventing undesired rotation about the axis.

22 Claims, 13 Drawing Sheets

U.S. PATENT DOCUMENTS

| | | |
|---|---|---|
| 6,665,906 B2 | 12/2003 | Li et al. |
| 6,698,063 B2 | 3/2004 | Kim et al. |
| 6,779,234 B1 * | 8/2004 | Lu et al. ....................... 16/340 |
| 7,177,144 B2 | 2/2007 | Ha et al. |
| 2004/0245419 A1 | 12/2004 | Sweere et al. |

* cited by examiner

FIG. 4A
FIG. 4B
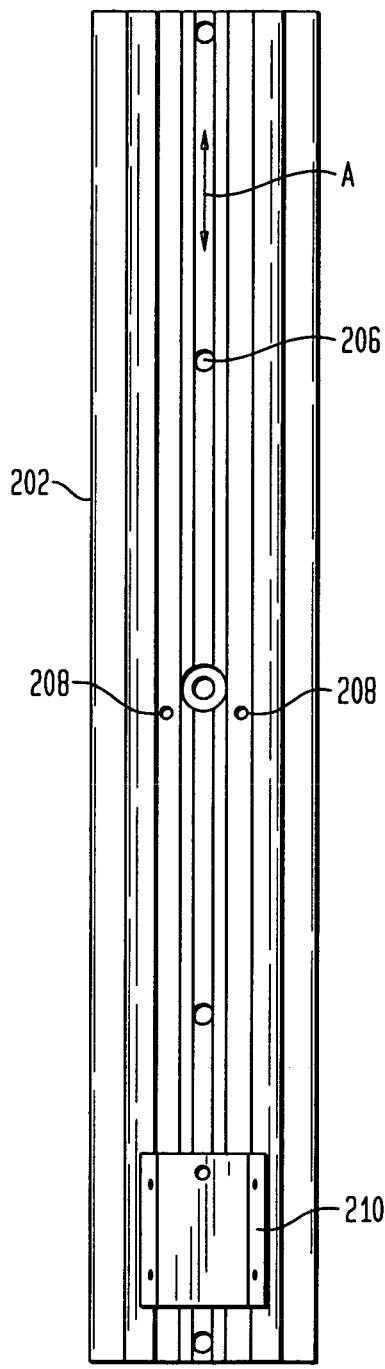
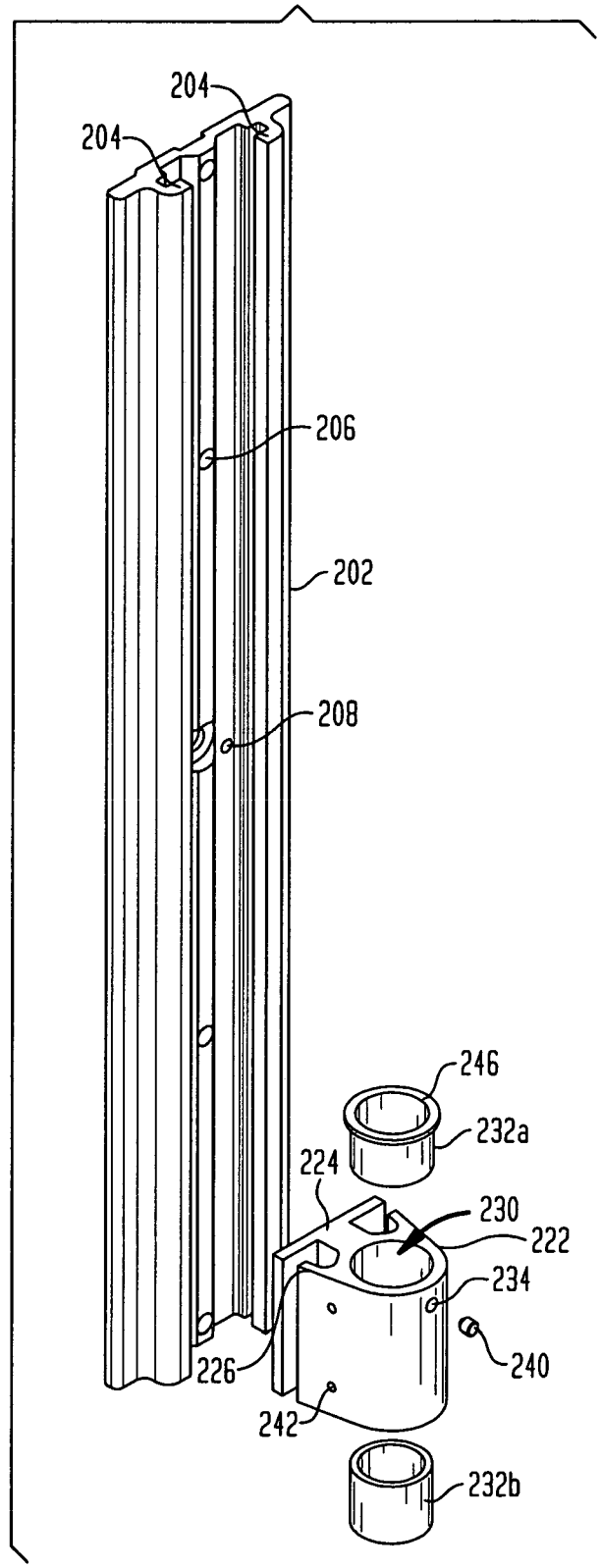

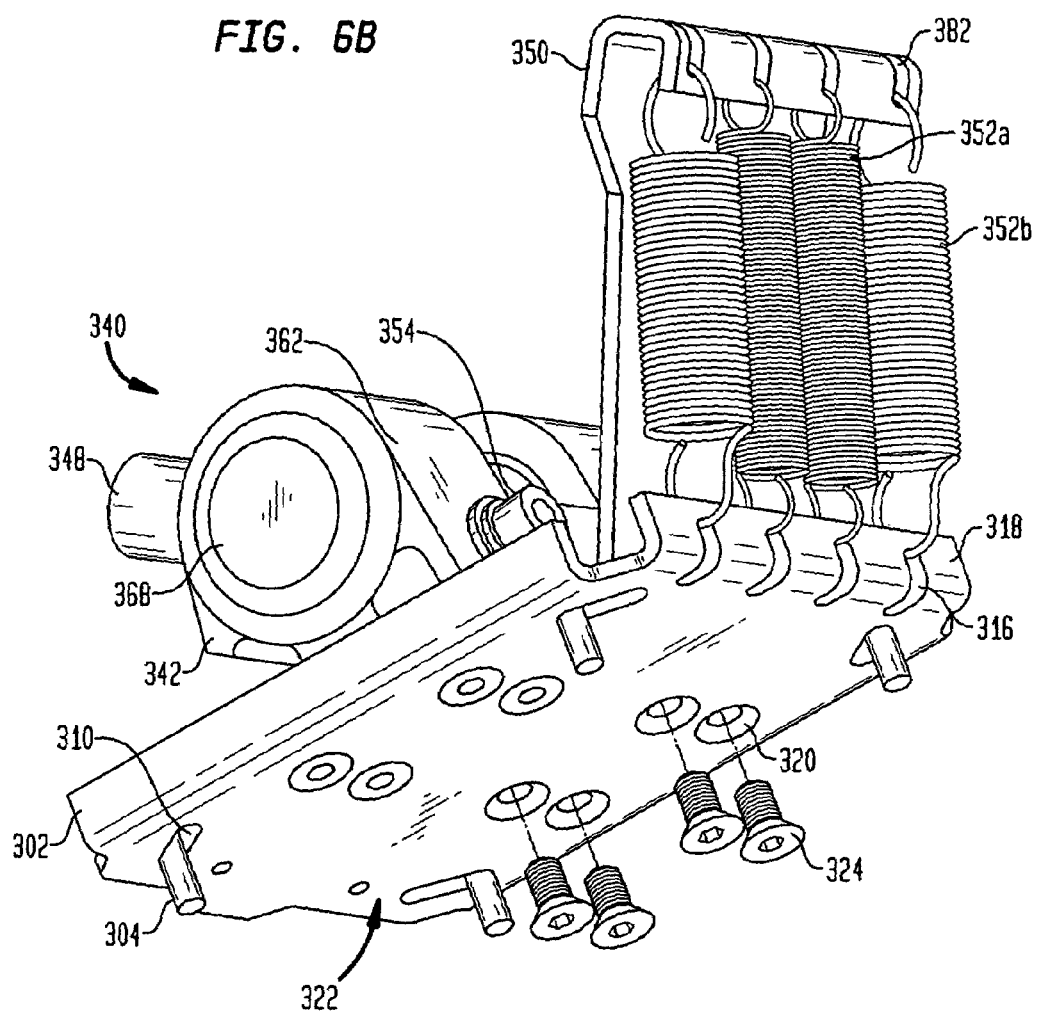

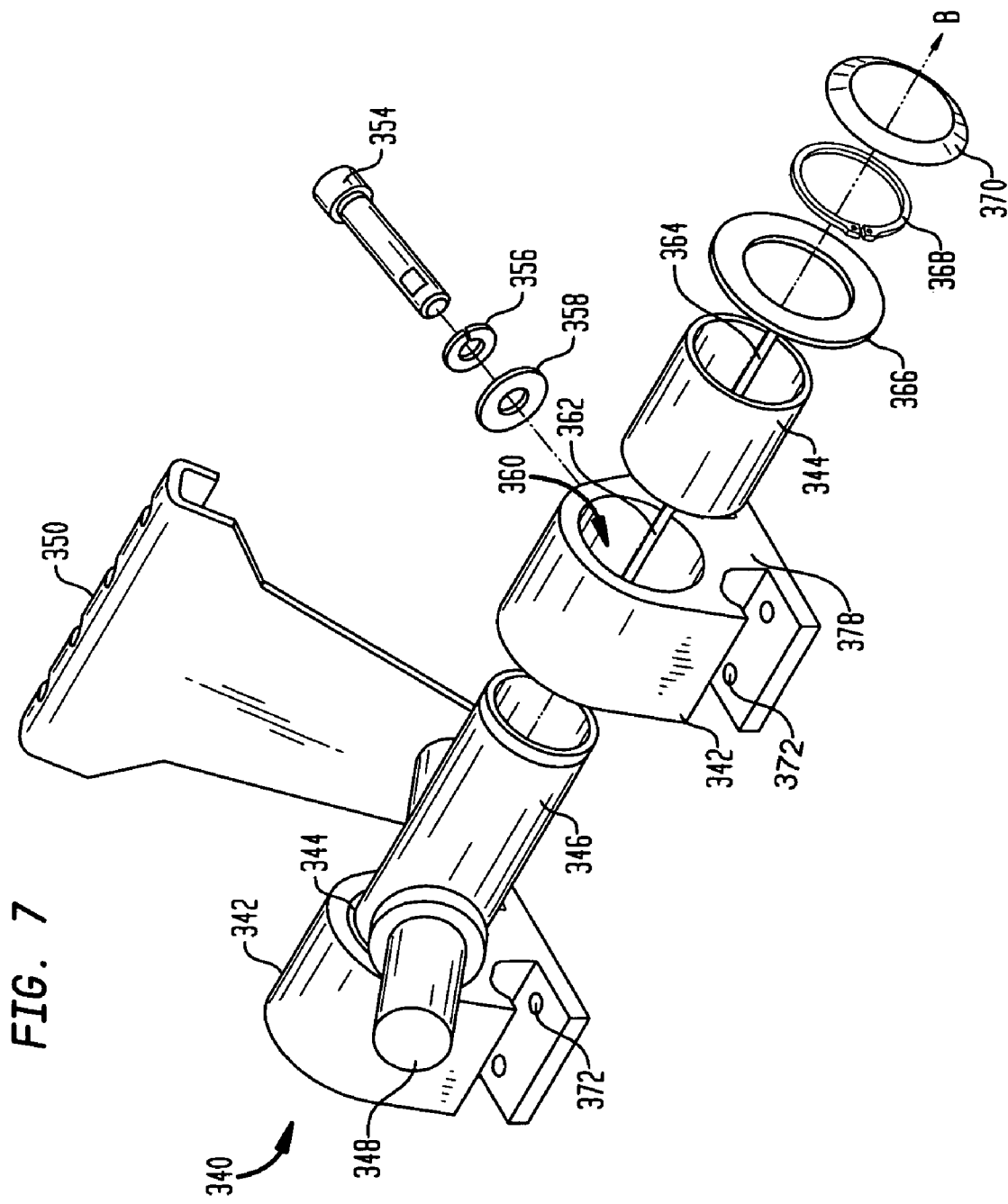

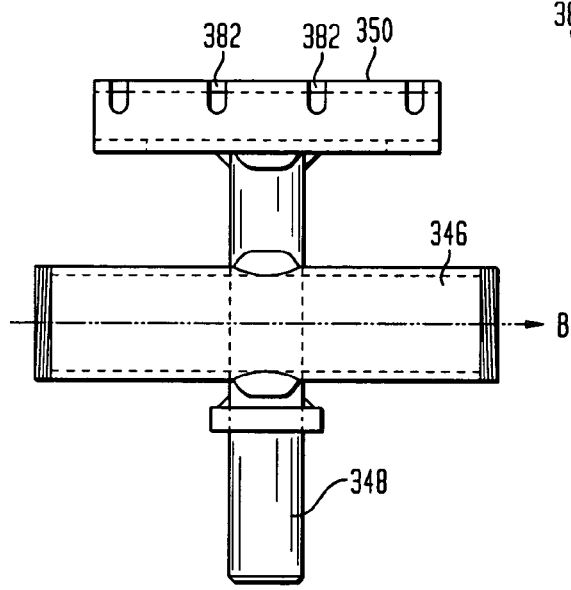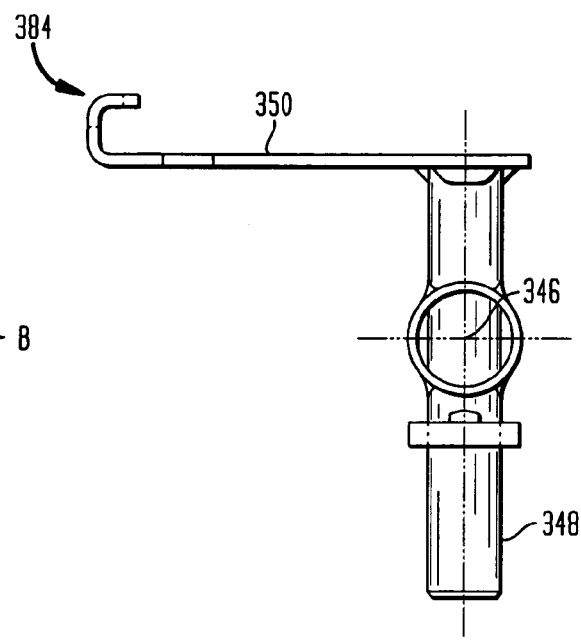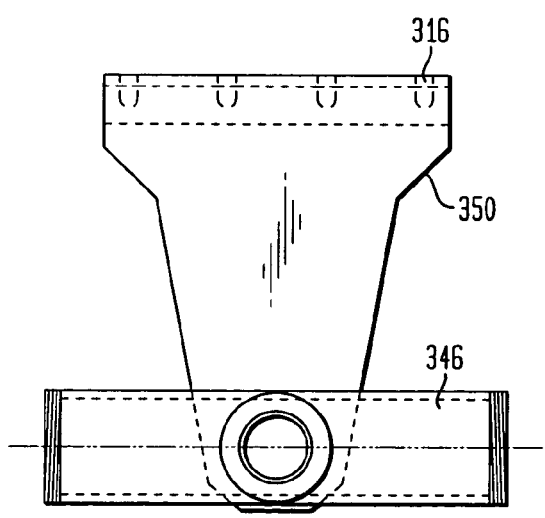

TILTER APPARATUS FOR ELECTRONIC DEVICE HAVING BIAS ASSEMBLY

BACKGROUND OF THE INVENTION

The present invention relates to a tilter apparatus for positioning electronic devices. More particularly, the present invention relates to a tilter apparatus having a bias assembly for adjustably positioning an electronic device such as a flat panel display.

In the past people have placed video monitors and other electronic equipment on desks, tabletops, or upon other equipment such as personal computers or workstations. One drawback to these configurations is the reduction in available workspace taken up by the equipment. Another drawback is the inability to place the equipment in a desired location. A further drawback is the potential for eye strain, neck strain and/or a cumulative trauma disorder such as carpel tunnel syndrome from poor placement of devices such as monitors and keyboards.

Different solutions have been provided in order to overcome these obstacles. For example, in one solution, a monitor stand or printer stand elevates the apparatus over other equipment on a desk. While this may free up workspace, it often places the equipment in an undesirable location. Another solution employs a mechanical extension arm to support the monitor. Extension arms free up workspace and allow users to place the equipment where it is wanted. One such extension arm is shown and described in U.S. Pat. No. 6,478,274, entitled "Arm Apparatus for Mounting Electronic Devices," which is fully incorporated by reference herein. Another type of extension arm is shown and described in U.S. Pat. No. 6,409,134, entitled "Arm Apparatus For Mounting Electronic Devices With Cable Management System," which is fully incorporated by reference herein.

These extension arms may attach to a workspace and provide for substantial freedom of movement of the monitor or other equipment near the workspace. However, in many cases it is not desirable to tie the extension arm to the workspace itself. In these situations, the extension arm may be mounted to a wall near the workspace using a wall mount assembly. In the past, such assemblies have used a single mounting piece that connects to the extension arm and attached to the wall. Unfortunately, this design may be unable to manage heavy or bulky loads, e.g., large screen monitors. Thus, there is a need for a wall mount assembly capable of handling these kinds of loads.

It is often desirable to obtain additional freedom of movement beyond that provided by the extension arm. A tilting device can be used to accomplish this goal. The tilting device connects between the extension arm and the equipment, allowing the equipment to rotate about one or more axis. One such tilting device is shown and described in U.S. Pat. No. 6,505,988, entitled "Tilter for Positioning Electronic Devices," which is fully incorporated by reference herein. However, existing tilter devices may not be fully compatible with heavy and/or bulky equipment, such as large screen monitors. Therefore, a need exists for tilting devices to address this concern.

SUMMARY OF THE INVENTION

In accordance with an embodiment of the present invention, a tilting device is provided. The tilting device includes an adapter plate and a tilter assembly. The adapter plate is adapted for attaching to a device. The tilter assembly includes a tilter shaft holder, a shaft, an arm mount, a tilter arm and a spring. The tilter shaft holder has a first opening therein and is coupled to the adapter plate. The first opening is aligned along an axis. The shaft is received within the first opening so as to be rotatable about the axis. The arm mount is coupled to the shaft and is adapted to engage a support. The tilter arm has a first end coupled to the shaft and a second end remote from the first end. The tilter arm is adapted to rotate about the axis upon rotation of the shaft. The spring has a first end connected to the adapter plate and a second end connected to the second end of the tilter arm. The spring is operable to provide counterbalance to the device. A bushing may be received within the first opening in the tilter shaft holder so as to receive the shaft. A locking mechanism may be provided to engage the tilter shaft holder and restrict rotation about the axis.

Preferably, the spring comprises a plurality of springs connecting the adapter plate to the second end of the tilter arm. In an alternative, at least of one of the plurality of springs is removable. In another example, the arm mount is inserted through the shaft substantially perpendicular to the axis. When the bushing is provided, the tilting device may include a set screw adapted to threadedly engage the tilter shaft holder and restrict rotation about the axis. In this case, the tilter shaft holder and the bushing may each have a slot disposed along the axis. When the set screw fully engages the tilter shaft holder, the tilter shaft holder slot and the bushing slot are compressible to restrict rotation about the axis. In an alternative, the tilter shaft holder slot extends the entire length of the tilter shaft holder. In another alternative, the bushing slot extends the entire length of the bushing.

In a further alternative, the tilter shaft holder comprises a pair of tilter shaft holders and the bushing comprises a pair of bushings received within the pair of tilter shaft holders. A first one of the pair holders may be disposed at a first end of the shaft and a second one of the pair of tilter shaft holders may be disposed at a second end of the shaft. Optionally, the tilting device further comprises a retaining ring adapted to engage an end of the bushing and to prevent movement of the bushing along the axis. If the retaining ring is provided, the tilter device preferably includes a cap to engage the end of the tilter shaft holder and covering the retaining ring and the bushing. In another alternative, the tilter shaft holder is coupled to the adapter plate by at least one screw. In yet another alternative, the second end of the tilter arm is angled so that the tilter arm does not interfere with the action of the spring. Preferably, in this case, the second end of the tilter arm is J-shaped.

In accordance with another embodiment of the present invention, a tilting device for adjustably mounting an electronic device is provided. The tilting device comprises a tilter shaft holder, a shaft, an arm mount, a tilter arm, a spring, and means for coupling the tilting device to the electronic device. The tilter shaft holder has an opening aligned along an axis. The shaft is received within the opening and is rotatable about the axis. The arm mount is coupled to the shaft and is adapted to engage a support. The tilter arm has a first end coupled to the shaft and a second end remote from the first end. The tilter arm is rotatable about the axis upon rotation of the shaft. The spring is in operative engagement with the tilter arm and the means for coupling so that the spring provides counterbalance to the electronic device.

Preferably, the tilter device further comprises a means for restricting rotation of the tilting device about the axis. More preferably, the means is a set screw adapted to threadedly engage the tilter shaft holder. In another alterative, the tilting device further comprises a bushing received within the opening of the tilter shaft holder. In this case, the shaft is received within the bushing. More preferably, the tilter shaft holder comprises a pair of tilter shaft holders and the bushing comprises a pair of bushings received within the pair of tilter shaft holders. In a further alternative, the tilting device includes a set screw adapted to threadedly engage the tilter shaft holder while restricting rotation of the tilting device about the axis. In this case, the tilter shaft holder and the bushing each have a slot disposed along the axis. When the set screw fully engages the tilter shaft holder, both the tilter shaft holder slot and the bushing slot are compressible to restrict rotation about the axis. In a further alternative, the spring comprises a plurality of springs. In this case, at least one of the plurality of springs may be removable.

In accordance with a further embodiment of the present invention, a tilting device having an adapter plate and a tilter assembly is provided. The adapted plate is for attaching to a device. The tilter assembly includes a tilter shaft holder, a shaft, an arm mount and a torsion spring. The tilter shaft holder is coupled to the adapter plate and has a first opening aligned along an axis. The shaft is received within the first opening so as to be rotatable about the axis. The arm mount is coupled to the shaft and is adapted to engage a support. The torsion spring is received within the shaft, and resists rotation of the shaft about the axis and provides counterbalance to the device.

In an alternative, the tilting device further comprises a locking mechanism for engaging the tilter shaft holder. In this case, the locking mechanism is adapted to prevent rotation about the axis. Preferably, the locking mechanism is a set screw adapted to further engage the tilter shaft holder. In another example, the tilting device further comprises a bushing received within the first opening in the tilter shaft holder. In this case, the shaft is received within the bushing. Preferably, the tilter shaft holder includes a pair of tilter shaft holders and the bushing includes a pair of bushings received within the pair of tilter shaft holders. More preferably, a first one of the pair of tilter shaft holders is disposed at a first end of the shaft, and a second one of the pair of tilter shaft holders is disposed at a second end of the shaft. In further alternative, the tilting device further comprises a set screw adapted to threadedly engage the tilter shaft holder in order to restrict rotation about the axis. In this case the tilter shaft holder and the bushing each preferably have a slot disposed along the axis. When the set screw fully engages the tilter shaft holder, both the tilter shaft holder slot and the bushing slot are compressible to restrict rotation about the axis. In further alternative, the tilting device further includes a tension mechanism for pre-tensioning the torsion spring. The tension mechanism preferably includes a body portion that is insertable into the torsion spring. Optionally, the tension mechanism includes at least one boss and the tilter shaft holder includes at least one recess. After pre-tensioning, the boss is inserted into the recess such that the torsion spring is securely received in the shaft. More preferably, the Boss and the recess are square-shaped. In another alternative, the torsion spring includes a first tang at a first end. The first tang is operable to engage the shaft. More preferably, the first tang protrudes from the torsion spring to engage an opening in the shaft. In a further alternative, the tilting device further comprises a plug. In this case, the torsion spring further includes a second tang at a second end of the torsion spring. The plug is adapted to engage the second tang and the tilter shaft holder. Preferably, the plug includes at least one boss and the tilter shaft holder includes at least one recess for receiving the boss.

In accordance with yet another embodiment of the present invention, a tilting device for adjustably mounting an electronic device is provided. The tilting device includes a tilter shaft holder, a shaft, an arm mount, a torsion spring and a means for coupling the tilting device to the electronic device. The tilter shaft holder has an opening aligned along an axis. The shaft is received within the opening and is rotatable about the axis. The arm mount is coupled to the shaft and is adapted to engage a support. The torsion spring is received within the shaft and resists rotation of the shaft about the axis and provides counterbalance to the electronic device.

In an alternative, the tilting device further comprises a means for restricting rotation of the tilting device about the axis. Preferably, this means is a set screw adapted to threadedly engage the tilter shaft holder. In another alternative, the tilting device preferably further comprises a bushing received within the opening of the tilter shaft holder. In this case, the shaft is received within the bushing. More preferably, the tilting device further includes a set screw adapted to further engage the tilter shaft holder in restricting rotation of the tilting device about the axis. In this situation, the tilter shaft holder and the bushing each have a slot exposed along the axis. When the set screw fully engages the tilter shaft holder, both the tilter shaft holder slot and the bushing slot compress so that rotation about the axis is restricted.

In accordance with another embodiment of the present invention, a tilting device is provided. The tilting device includes an adapter plate, a tilter shaft holder, a shaft and a spring device. The adapter plate is for attaching to a device. The tilter shaft holder is coupled to the adapter plate and has an opening aligned along an axis. The shaft is received within the opening so as to be rotatable about the axis. The spring device is in operative relation to the shaft, wherein the spring device is adapted to provide counterbalance to the device.

In an alternative, the spring device operatively engages the adapter plate and the shaft. In another alternative, the spring device is received within the shaft. In a further alternative, the tilting device further comprises a bushing received within the opening. In this case, the shaft is received within the bushing.

In accordance with a further embodiment of the present invention, a tilter assembly for counterbalancing a device is provided. The tilter assembly comprises a tilter shaft holder, a shaft and a spring device. The tilter shaft holder has a first opening aligned along an axis. The shaft is adapted to be coupled to a support. The shaft is received within the first opening for rotation about the axis. The spring device is in operative association with the shaft for counterbalancing the device when attached to the tilter assembly. In one alternative, the spring device comprises a torsion spring received within the shaft. The torsion spring resists rotation of the shaft about the axis and provides counterbalance to the device. The tilter assembly may also include a tension mechanism for pre-tensioning the torsion spring. In this case, the tension mechanism preferably includes a boss and the tilter shaft holder preferably includes a recess. After pre-tensioning, the boss is inserted into the recess such that the torsion spring is securely received within the shaft. In another alternative, the spring device comprises a tilter arm and a spring. The tilter arm has a first end coupled to the shaft and a second end remote from the shaft. The tilter arm is adapted to rotate about the axis upon rotation of the shaft. The spring has a first end operatively coupled to the device and a second end connected to the second end of the tilter arm. The spring is operable to provide counterbalance to the device. Preferably, the spring comprises a plurality of springs. More preferably, at least one of the springs is removable.

BRIEF DESCRIPTION OF THE DRAWINGS

FIGS. 4A-C illustrate several views of the rail mounting assembly in accordance with an embodiment of the invention.

FIGS. 6A-B illustrate perspective views of a tilter device in accordance with an embodiment of the invention.

FIG. 7 is an exploded assembly drawing of a tilter assembly in accordance with an embodiment of the invention.

FIGS. 9A-C illustrate a tilter arm in accordance with an embodiment of the invention.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

Figure 1:
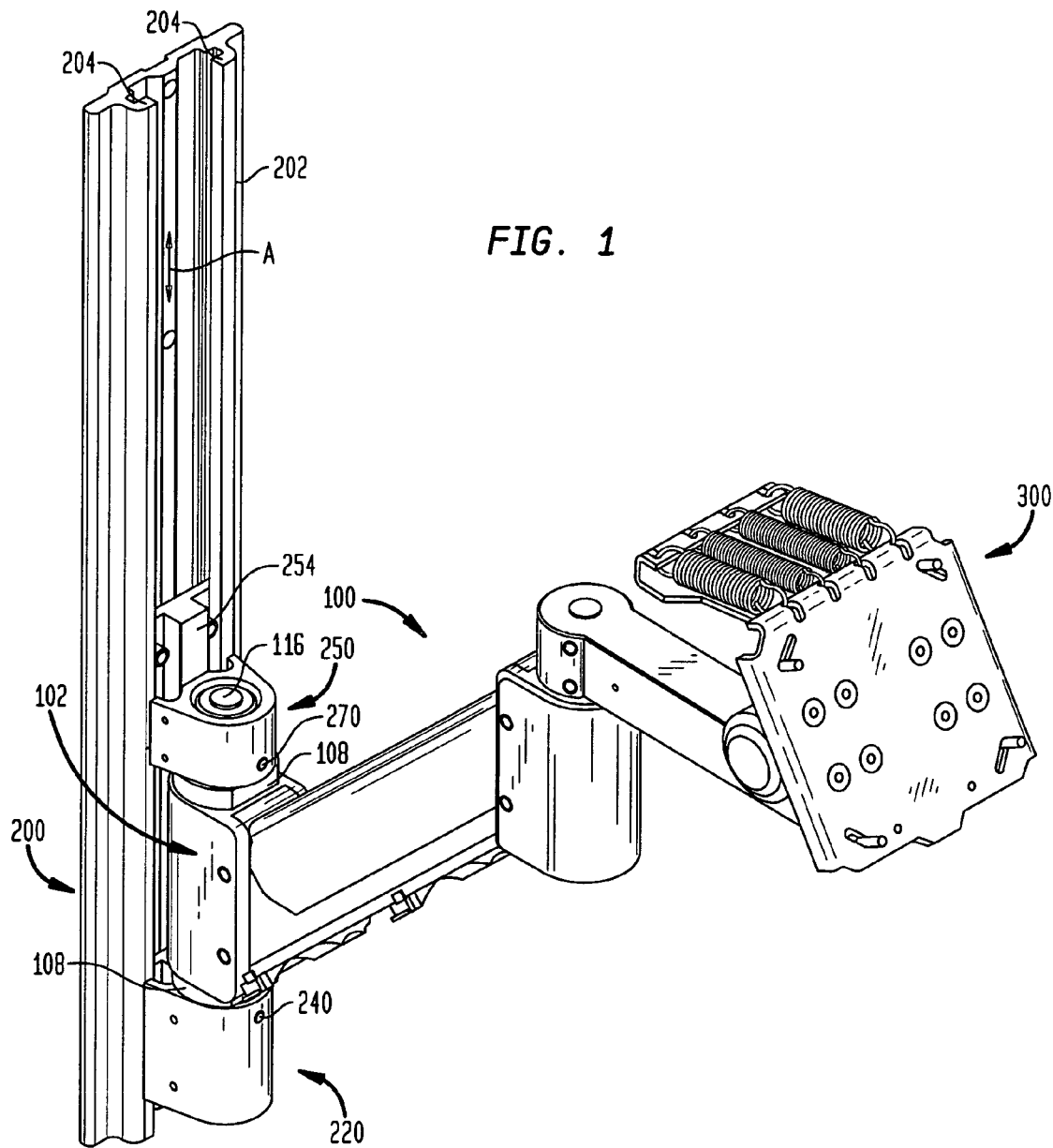
FIG. 1 illustrates a rail-mounted extension arm assembly connected to a tilting device for adjustably mounting an electronic device in accordance with an embodiment of the invention.

FIG. 1 illustrates an extension arm 100 engaged at one end to a rail mount 200 and attached to a tilting device 300 at the other end. The rail mount 200 may be affixed to a wall or other substantially flat surface. The features of the rail mount 200 will be explained in more detail below with regard to FIGS. 3-5. The tilting device 300 is adapted to attach to an electronic device, and provides a bias or counterbalance so that the electronic device can be readily maintained in a desired position. While the electronic device is described below as a flat screen monitor or other video monitor, the invention is not limited to use with such devices, and may be used with a wide variety of equipment. The features of the tilting device 300 will be explained in more detail below with regard to FIGS. 6-10.

Figure 2:
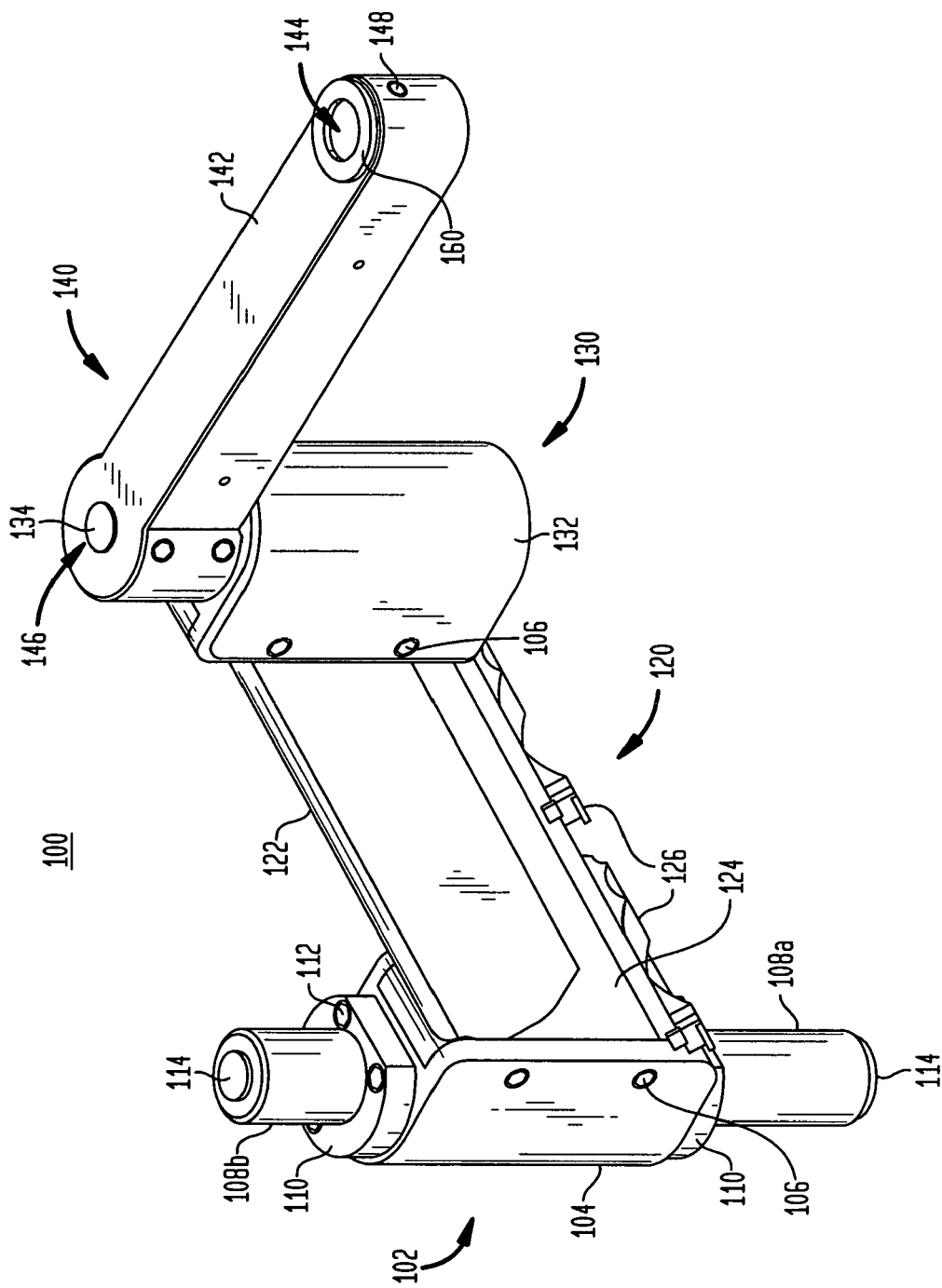
FIG. 2 illustrates a detailed view of the extension arm of FIG. 1.

The extension arm 100 may be a conventional extension arm, and will now be described generally with reference to FIG. 2. Preferably, the extension arm 100 is one of the types fully described in above-referenced U.S. Pat. Nos. 6,409,134 and 6,478,274. As shown in FIG. 2, the extension arm 100 includes a first endcap 102, an arm 120, a second endcap 130 and a forearm extension 140.

The first endcap 102 includes a housing 104 attached to one end of the arm 120 by, for example, pins 106. At least one shaft 108 is adapted for connection to the rail mount 200. Preferably, the shaft 108 comprises a lower shaft 108a and an upper shaft 108b separately engaged to the housing 104. One or both of the lower shaft 108a and the upper shaft 108b may be integrally molded with an endwall of the housing 104. Alternatively, one or both of the lower shaft 108a and the upper shaft 108b may be secured to the housing 104 by sleeves 110. In this case, the sleeves 110 may be affixed to the top and bottom endwalls of the housing 104 by screws 112. The shaft 108 may be covered at either end by top hat plugs 114 to enhance the visual appearance.

The arm 120 is preferably formed of an upper housing 122 and a lower housing 124. The upper housing 122 and the lower housing 124 define a chamber therebetween containing, e.g., a gas spring (not shown). The gas spring is preferably adjustably mounted at one end within the first endcap 102 and at the other end to, e.g., a ball stud mounted within the upper housing 122. As shown in FIG. 2, the arm 120 may include one or more external cable ties 126 in order to secure the cable of an electronic device supported by the extension arm 100. Alternatively, the cable may be secured within the arm 120 as shown and described in U.S. Pat. No. 6,409,134.

The second endcap 130 has a housing 132 attached to the second end of the arm 120 by, for example, pins 106. A shaft 134 preferably extends out of the top of the housing 132 and connects to the forearm extension 140. The forearm extension 140 includes a body 142 having channels 144 and 146 at each end thereof. The shaft 134 is received within the channel 146, and the forearm extension 140 is rotatable about the shaft 134. A bushing 160 may be received within the channel 144. The tilting device 300 can be inserted into the bushing 160, and is rotatable within the channel 144. The forearm extension 140 preferably has a locking mechanism for restricting movement of the tilting device 300 within the channel 144. The locking mechanism may be a set screw 148 that is insertable into a wall of the channel 144. When the set screw 148 is tightened, it causes the bushing 160 to flex inward and frictionally engage the tilting device 300 and thus prevent the tilting device 300 from rotating within the channel 144.

The upper housing 122, the lower housing 124, the first endcap 102 and the second endcap 130 are configured so as to form an adjustable parallelogram. When configured, the housing 104 of the first endcap 102 and the housing 132 of the second endcap 130 point in opposite directions. The shape of the parallelogram is retained by the gas spring within the chamber of the arm 120. Generally, the gas spring is sized so as to have a fixed length until an upward or downward force is exerted at the second endcap 130 that exceeds the gas spring's designed resistance. Thus, the gas spring retains the parallelogram shape when the only force exerted at the second endcap 130 is the weight of the flat screen device. However, the gas spring permits the parallelogram shape to be adjusted when a user pushes the flat screen device, which is preferably coupled to the forearm extension 140 by means of the tilting device 300, up or down.

Figure 3:
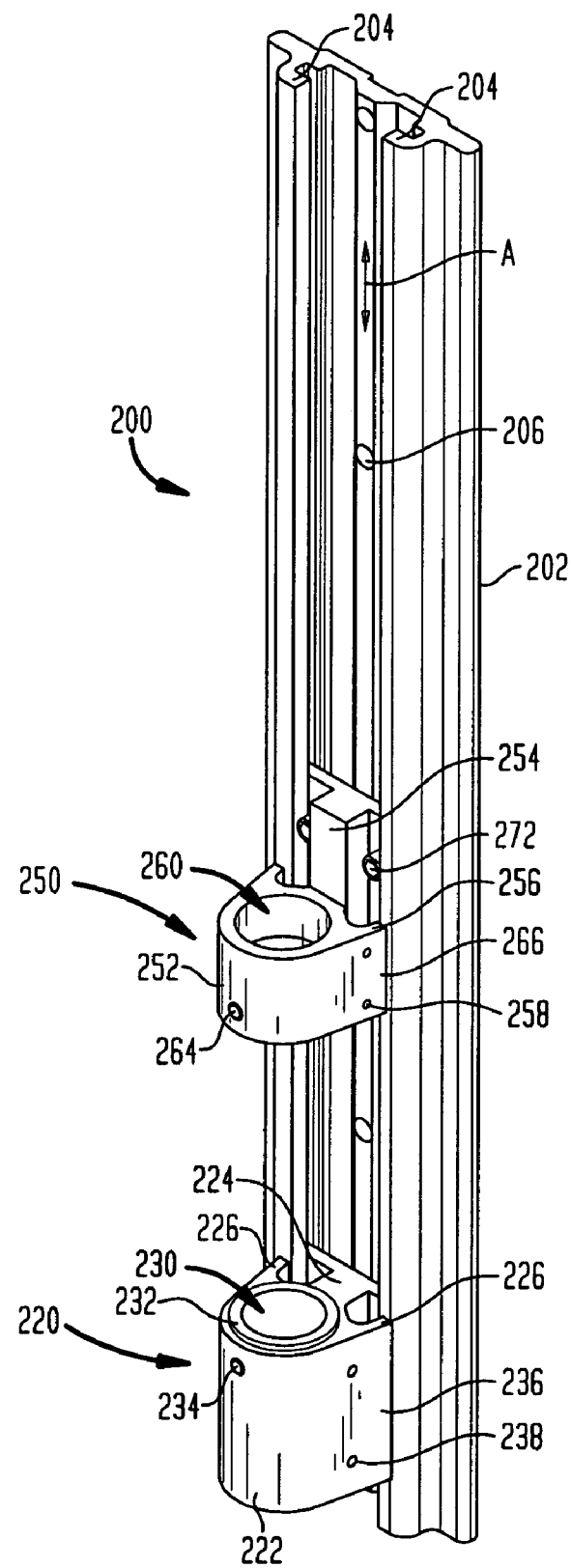
FIG. 3 illustrates a view of a rail mounting assembly in accordance with an embodiment of the present invention.
Figure 4C:
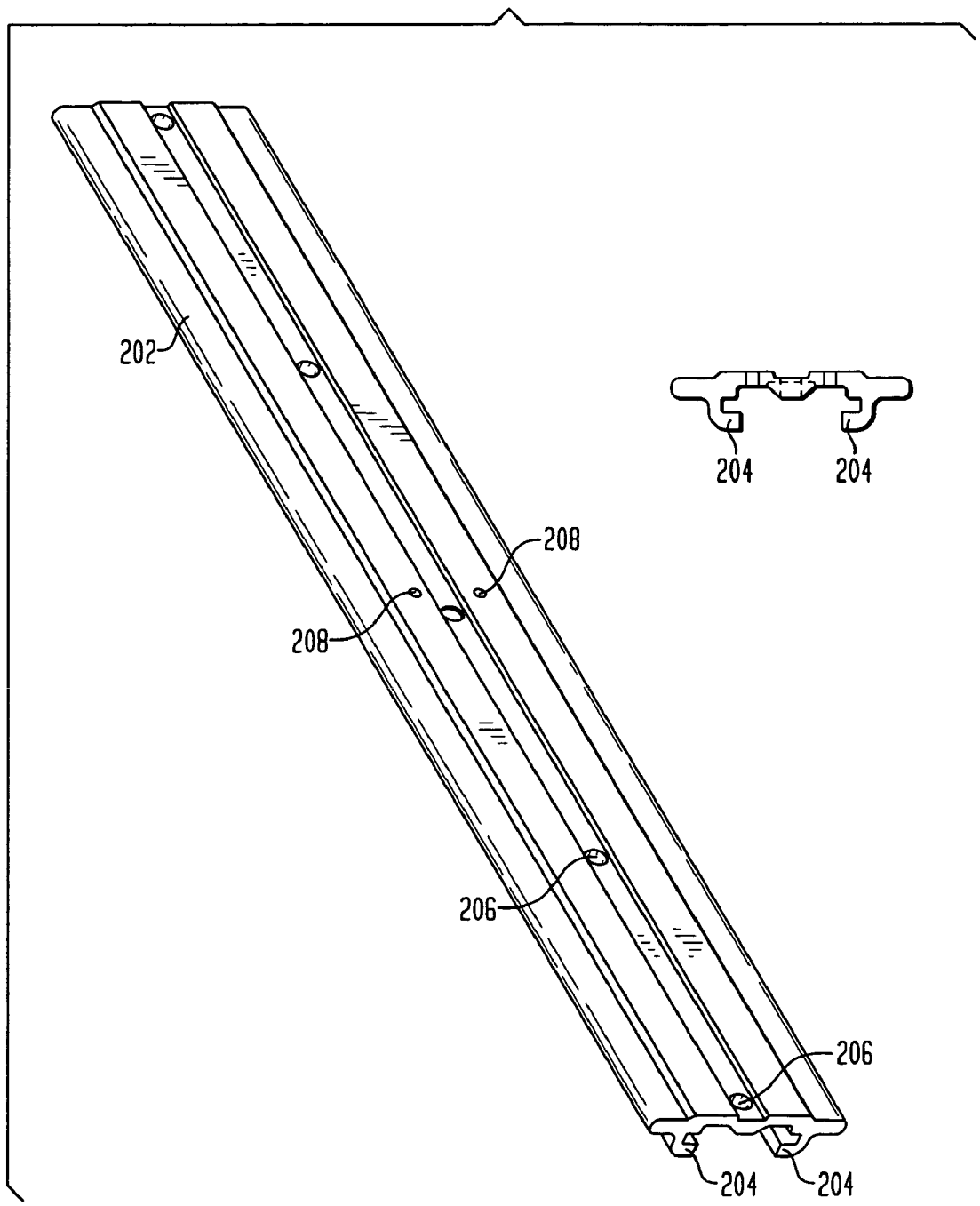

Referring back to FIG. 1, it can be seen that both the upper shaft 108b and, the lower shaft 108a are engaged with the rail mount 200. FIG. 3 illustrates the rail mount 200 in more detail. The rail mount 200 includes a wall mount 202, a lower mount 220 and an upper mount 250. The wall mount 202 may be formed of a metal or other suitable material. The wall mount 202 includes a pair of opposing, parallel rails 204, which define an elongated opening to receive the lower mount 220 and the upper mount 250. An axis A is defined along a line between the rails 204. The shafts 108a,b of the first endcap 102 are pivotal about the axis A, as will be described below. The wall mount 202 may have one or more holes 206 adapted to receive fasteners for attaching the wall mount 202 to a surface. While the holes 206 are shown in FIGS. 4A-C spaced along the axis A between the rails 204, the holes 206 may be located in any position on the wall mount 202. Preferably, the holes 206 are located so that they are not covered by or interfere with placement of the lower mount 220 and the upper mount 250. As seen in FIGS. 4A-C, the wall mount 202 may also include holes 208 for attaching the upper mount 250, as will be explained below.

Figure 5A:
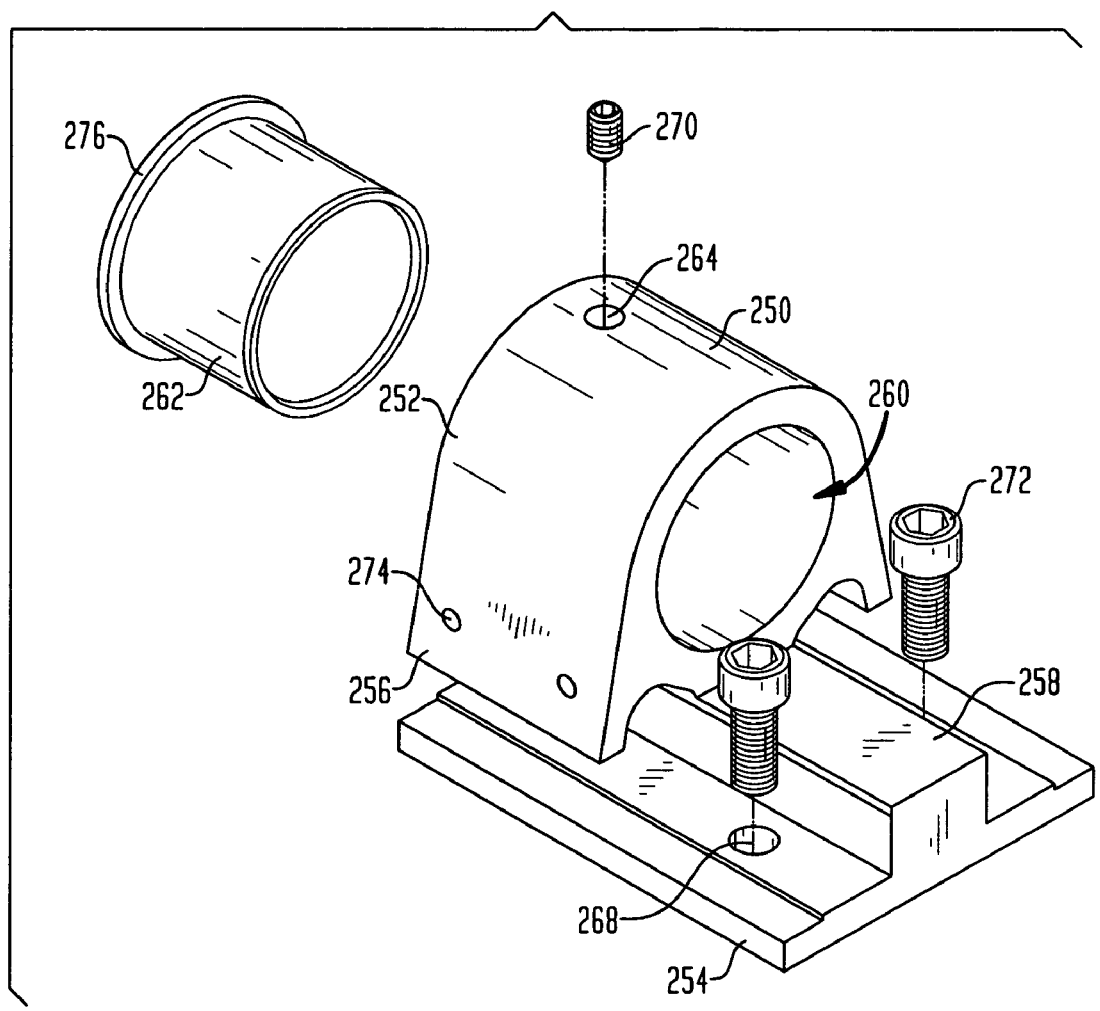
FIGS. 5A-B illustrate views of upper and lower mounts of a rail mounting assembly in accordance with an embodiment of the invention.
Figure 5B:
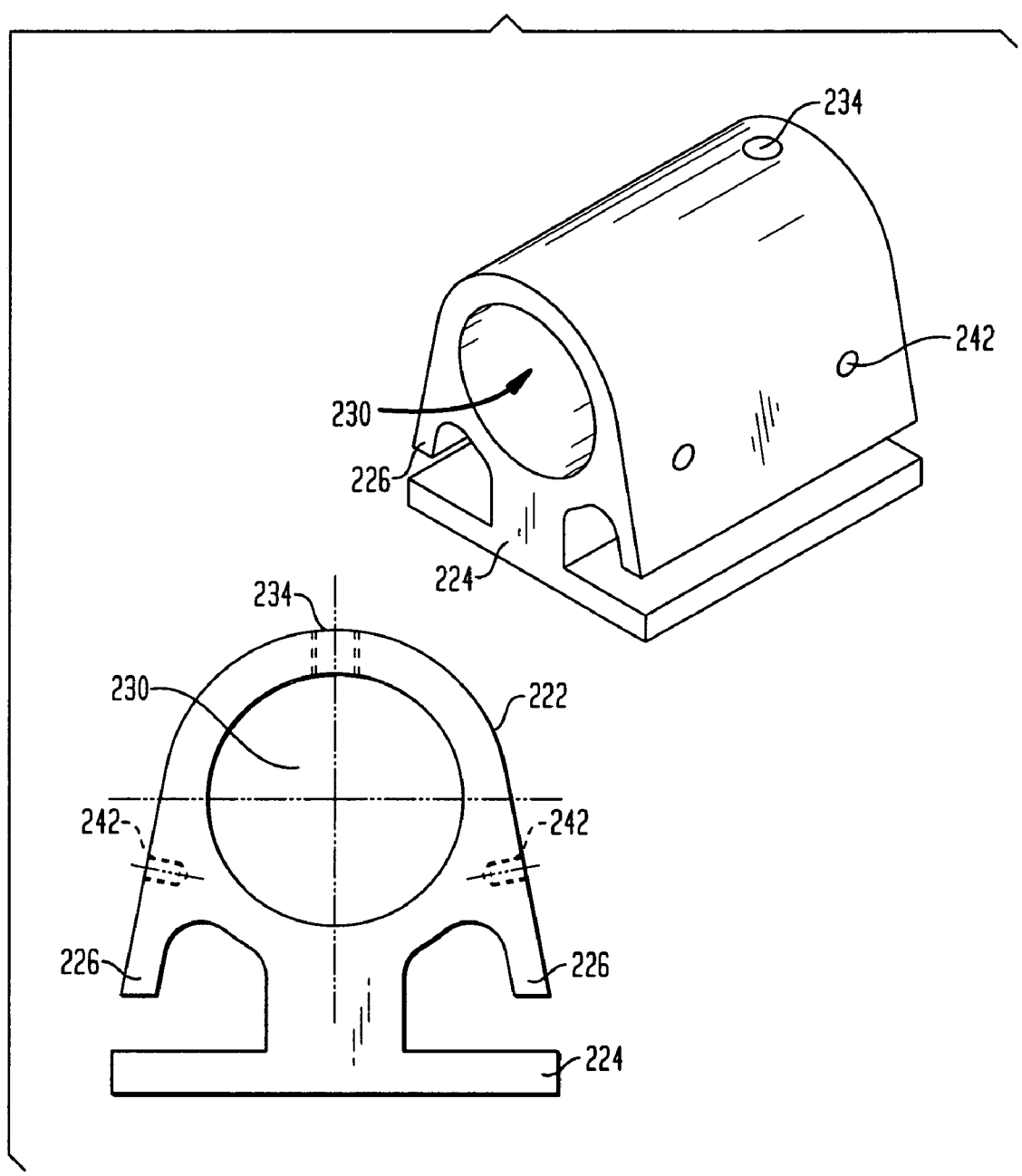

It can be seen in FIGS. 4B and 5B, that the lower mount 220 includes a body 222, a "T" structure 224, and flanges 226. The body 222 includes a central opening 230, which would be aligned along the axis A. The central opening 230 is adapted to receive a bottom bushing 232 as seen in FIG. 3. The bottom end of the lower shaft 108a of the first endcap 102 is insertable into the bottom bushing 232. The bottom bushing 232 provides a bearing surface upon which the bottom end of the lower shaft 108a may rotate. Preferably, the bottom bushing 232 is made of plastic, providing a smooth surface that minimizes friction and avoids metal-to-metal contact between the lower shaft 108a and the body 222. Moreover, a lip 246 of the bottom bushing 232 (FIG. 4B) preferably protrudes from the central opening 230 and acts as a washer between the lower sleeve 110 of the first endcap 102 and the body 222. This again minimizes friction, and avoids metal-to-metal contact. The bottom bushing 232 may comprise separate pieces 232a and 232b, as shown in FIG. 4B. The piece 232a preferably includes the lip 246. The separate pieces 232a and 232b may be press fit into the central opening 230.

As seen in FIG. 3, the T structure 224 is insertable into the rails 204, and the flanges 226 ride over the rails 204. The T structure 224 and the flanges 226 are structured to engage opposite faces of the rails 204. Thus, the lower mount 220 can slideably engage the rails 204 along the axis A. The lower mount 220 may be removably or permanently affixed to the wall mount 202. As shown in FIG. 4A, the lower mount is preferably permanently attached to the wall mount 202 by welding the T structure 224 to the body of the wall mount 202 and/or by welding the flanges 226 to the rails 204.

Returning to FIG. 3, a wrapper 236 may cover the body 222. The wrapper 236 may be, for example, plastic sheeting to prevent abrasion between the arm 120 and the body 222. The wrapper 236 may be attached to the body 222 using screws or other fasteners 238 that are insertable into holes 242, which are shown in FIG. 5B. Alternatively, the wrapper 236 may be glued or otherwise adhered to the body 222. The wrapper 236 may be selected based upon color, texture, durability, cost and/or other criteria.

The body 222 preferably includes a locking mechanism for restricting movement of the bottom end of the lower shaft 108a within the central opening 230. As shown in FIG. 4B, the locking mechanism is preferably a set screw 240 that is insertable into a hole 234 in a wall of the body 222. When the set screw 240 is tightened, it causes the bottom bushing 232 to flex inward and frictionally engage the bottom end of the lower shaft 108a and thus prevent the first endcap 102 from rotating about the axis A. Alternatively, the locking mechanism may be any other mechanism, e.g., a latch, clamp, clasp or hasp, which is capable of performing the equivalent function to constrict rotation about the axis A. When the bottom bushing 232 comprise the separate pieces 232a and 232b, the set screw 240 is preferably placed to cause the piece 232a to flex inward and frictionally engage the bottom end of the lower shaft 108a.

The upper mount 250 is illustrated by the exploded view of FIG. 5A. The upper mount 250 includes a body 252, an extended "T" structure 254, and flanges 256. The body 252 includes a central opening 260, which will be aligned with the axis A and the central opening 230 of the lower mount 220 when the upper mount 250 is inserted into the rails 204. The central opening 260 is adapted to receive a top bushing 262, which may be press fit therein. The top end of the upper shaft 108b of the first endcap 102 is insertable into the top bushing 262. The top bushing 262 provides a bearing surface upon which the top end of the upper shaft 108b may rotate. Preferably, the top bushing 262 is made of plastic, providing a smooth surface that minimizes friction and avoids metal-to-metal contact between the upper shaft 108b and the body 252.

Moreover, a lip 276 of the top bushing 262 (FIG. 5A) preferably protrudes from the central opening 260 and acts as a washer between the upper sleeve 110 of the first endcap 102 and the body 252. This again minimizes friction, and avoids metal-to-metal contact.

As seen in FIG. 3, the extended T structure 254 is insertable into the rails 204, and the flanges 256 ride over the rails 204. Thus, the upper mount 250 can slideably engage the rails 204 along the axis A. The extended T structure 254 preferably includes a portion 258 that extends past the body 252. The portion 258 preferably includes one or more holes 268 having the same size and spacing as the holes 208 of the wall mount 202. The upper mount 250 may be removably affixed to the wall mount 202 using a retaining mechanism. For example, the retaining mechanism may be screws 272 or other fasteners inserted through the holes 268 into the holes 208 of the wall mount 202.

As seen in FIG. 3, a wrapper 266 may cover the body 252. The wrapper 266 may be, for example, a plastic sheeting to prevent abrasion between the arm 120 of the extension arm 100 and the body 252. The wrapper 266 may be attached to the body 252 using screws or other fasteners 258 that are insertable into holes 274, which are shown in FIG. 5A. Alternatively, the wrapper 266 may be glued or otherwise adhered to the body 252. The wrapper 266 may be selected based upon color, texture, durability, cost and/or other criteria.

Returning to FIG. 1, it can be seen that the lower and upper shafts 108a,b of the first endcap 102 are securely retained by the lower mount 220 and the upper mount 250, respectively. A user may adjust the placement of a flat screen monitor by pivoting the lower and upper shafts 108a,b about the axis A. Once the desired position is attained, the user can secure the shafts 108a,b by tightening the set screws 240 and 270 in the lower mount 220 and the upper mount 250, respectively.

As described above, the lower mount 220 need not be permanently affixed to the wall mount 202. Instead, it is possible to adjustably position the lower mount 220 and the upper mount 250 at desired points along the axis A by removably securing the lower mount 220 and the upper mount 250 to the wall mount 202. For example, the extended T structure 254 having the holes 268 may be used in place of the T structure 224. In this example, the wall mount 202 may include a series of holes 208 spaced along the axis A. The user could affix the wall mount 202 to a surface, position the lower mount 220 at a desired height by selecting the appropriate pair of holes 208, and affix the lower mount to the wall mount 202 by fastening screws 272 through the holes 268 into the selected holes 208. Then the lower end of the lower shaft 108a is inserted into the central opening 230 of the lower mount 220. The upper mount 250 is then lowered along the rails 204 until the upper end of the upper shaft 108b is engaged by the central opening 260 of the upper mount 250.

As shown in the figures and described above, the rail mount 200 retains the extension arm 100 and allows it to rotate about the axis A so that a user may position a flat panel monitor in a desired location. The load and the torque generated by the flat panel monitor are distributed across both the lower mount 220 and the upper mount 250. The upper mount 250 ensures that the shafts 108a,b are securely retained, and allows the rail mount 200 to sustain a heavier load than situations in which only the lower mount 220 is used.

Figure 6A:
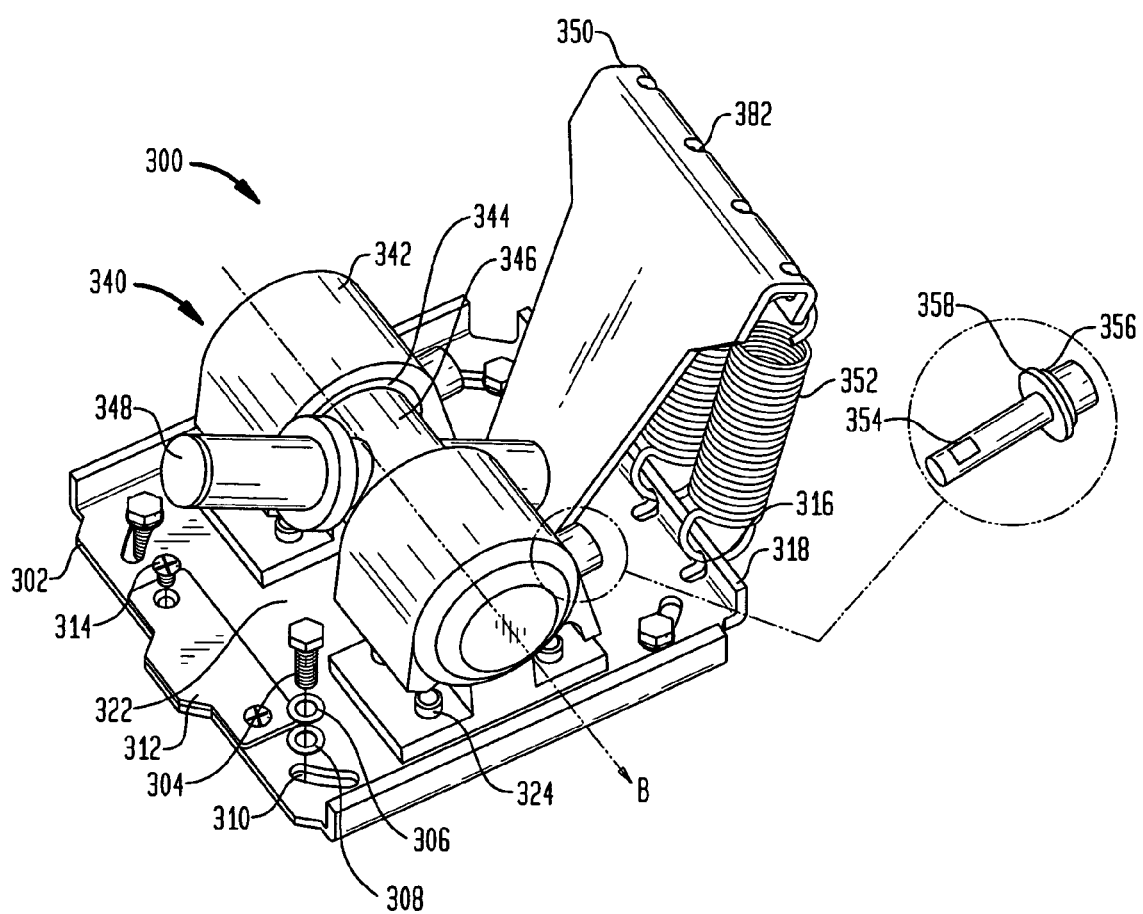

The tilting device 300 is shown in detail in FIGS. 6A and 6B. It includes an adapter plate 302 and a tilter assembly 340. The adapter plate 302 may be secured to a flat screen monitor by screws 304 inserted through slots 310. Preferably, a lock washer 306 and a flat washer 308 are placed between the head of each screw 304 and the adapter plate 302. A base plate pad 312 may be secured to the adapter plate 302 by one or more screws 314. The base plate pad 312 serves to prevent abrasion of the adapter plate 302 with the arm 120, and is preferably the same material as the wrappers 236 and 266 of the rail mount 200. The adapter plate 302 preferably also includes one or more holes 316 along a side 318 and one or more holes 320 in a central portion 322 for securing components of the tilter assembly 340, as will be described below.

The tilter assembly 340 includes tilter shaft holders 342, bushings 344, a tilter shaft 346, an arm mount 348, a tilter arm 350, at least one spring 352 and a locking mechanism 354. The tilter shaft holders 342 may be affixed to the adapter plate 302 by fasteners 324 inserted through the holes 320 in the adapter plate 302 and through the holes 372 (FIG. 7) in a base portion of the tilter shaft holders 342. As shown in FIGS. 6A-B, two tilter shaft holders 342 engage the tilter shaft 346, which is rotatable about an axis B. In alternate embodiments, a single tilter shaft holder 342 may engage one or both ends of the tilter shaft 346. The tilter shaft holder(s) 342 is preferably a metal such as aluminum.

Figure 8A:
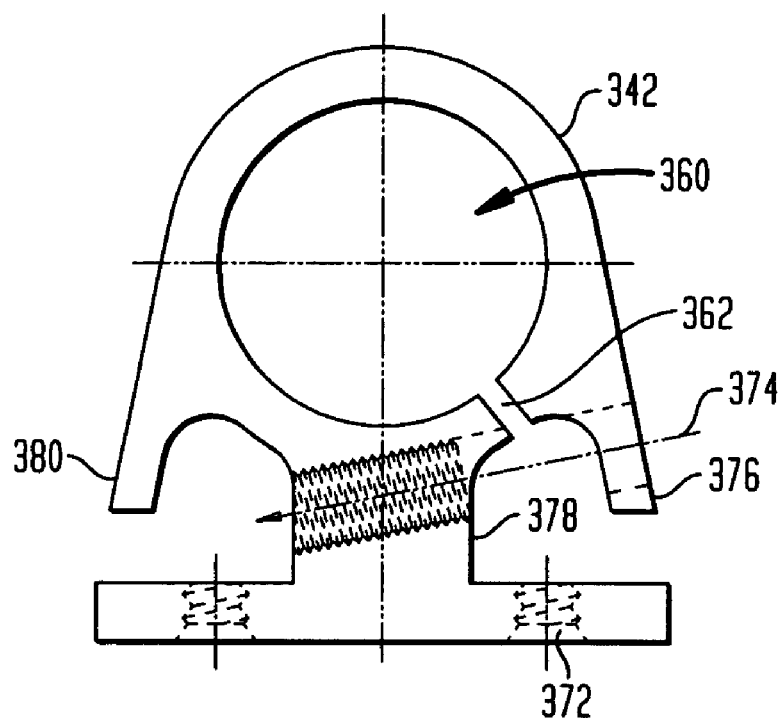
FIGS. 8A-B illustrate a tilter shaft holder in accordance with an embodiment of the invention.
Figure 8B:
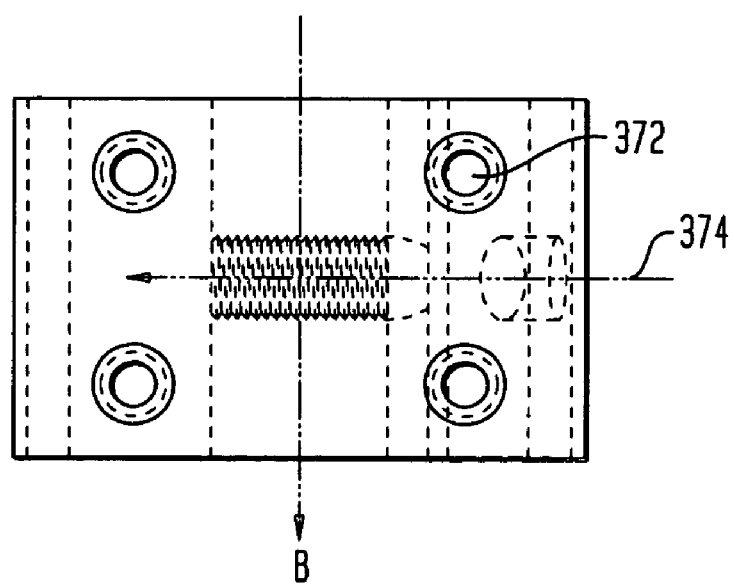

The tilter shaft holder 342 is shown in more detail in the side and bottom views of FIGS. 8A-B, respectively. A shaft opening 360 is dimensioned so as to receive the bushing 344 and the tilter shaft 346 therein. A slot 362 is provided along the sidewall of the shaft opening 360. Preferably, the slot 362 extends the length of the shaft opening 360. A bore 374 preferably extends through a first flange 376 into a stem 378 of the tilter shaft holder 342. The tilter shaft holder 342 may include a second flange 380 opposite the first flange 376. The locking mechanism 354 is preferably a set screw, and the bore 374 is preferably at least partly threaded to receive the set screw. The threads of the set screw may be coated with nylon to securely engage the set screw with the bore 374. Alternatively, the locking mechanism 354 may be any other mechanism, e.g., a latch, clasp, hasp or clamp, which performs the equivalent function to constrict rotation about the axis B.

As seen in the exploded view of FIG. 7, the bushing 344 includes a slot 364 provided along its sidewall. Preferably, the slot 364 extends the length of the sidewall of the bushing 344 such that the bushing 344 has a non-closed annular shape. The bushing 344 is preferably a metal such as bronze. The bushing 344 is inserted into the shaft opening 360. The slot 364 of the bushing 344 need not be aligned with the slot 362 of the tilter shaft holder 342. The tilter shaft 346 may then be inserted into shaft opening 360.

A washer 366 and a retaining ring 368 may be inserted over the tilter shaft 346 and the bushing 344. An endcap 370 may cover this portion of the tilter assembly 340. The endcap 370 may be a plastic plug or other suitable covering.

The arm mount 348 may be inserted into the channel 144 of the forearm extension 140 (FIG. 2). As seen in FIG. 7, the arm mount 348, in the nature of a shaft, may extend perpendicularly through the tilter shaft 346. Preferably, both the arm mount 348 and the tilter shaft 346 are a metal such as aluminum. The arm mount 348 may be welded to the tilter shaft 346. When the arm mount 348 is securely attached to the forearm extension 140, the adapter plate 302 may be adjusted, rotating about the axis B until the electronic device is appropriately positioned. Then the locking mechanism 354 may be engaged by, e.g., inserting the set screw into the bore 374 and tightening to close the slot 362 and the slot 364, as seen in FIG. 6B, to restrict motion about the axis B. A lock washer 356 and/or a protective washer 358 may separate the head of the set screw from the tilter shaft holder 342.

As seen in FIG. 9, the tilter arm 350 preferably attaches to the tilter shaft 346 by connection to an end of the arm mount 348. The tilter arm 350 may be welded to the arm mount 348.

At the end of the tilter arm 350, one or more holes or slots 382 are preferably provided for the springs 352 to engage. The springs 352 attach at one end to the holes 316 along the side 318 of the adapter plate 302 and attach at the other end to the holes 382 in the tilter arm 350. One or more of the springs 352 is preferably removable, which allows the user to adjust the biasing/counterbalancing. Preferably, the end 384 of the tilter arm 350 is shaped so that tilter arm 350 does not interfere with or otherwise contact the springs 352. As seen in the figure, the end 384 has a "J" shape to achieve this goal.

The springs 352 provide a counterbalance or bias to ensure that a heavy and/or bulky electronic device does not cause the adapter plate 302 to rotate about the axis B even though the locking mechanism 354 is engaged. While a single spring 352 may be used, preferably two or more springs are employed. As seen in FIG. 6B, the springs 352 may include different kinds of springs 352a and 352b, which may be selected depending upon the weight of the electronic device attached to the adapter plate 302. The springs 352a,b may be selected to have different spring tensions. The springs 352 are preferably made from steel spring wire. The springs 352 may be viewed generally as a biasing device, and other devices or structures capable of providing such biasing may be using in place of or complementary with the springs 352.

Figure 10:
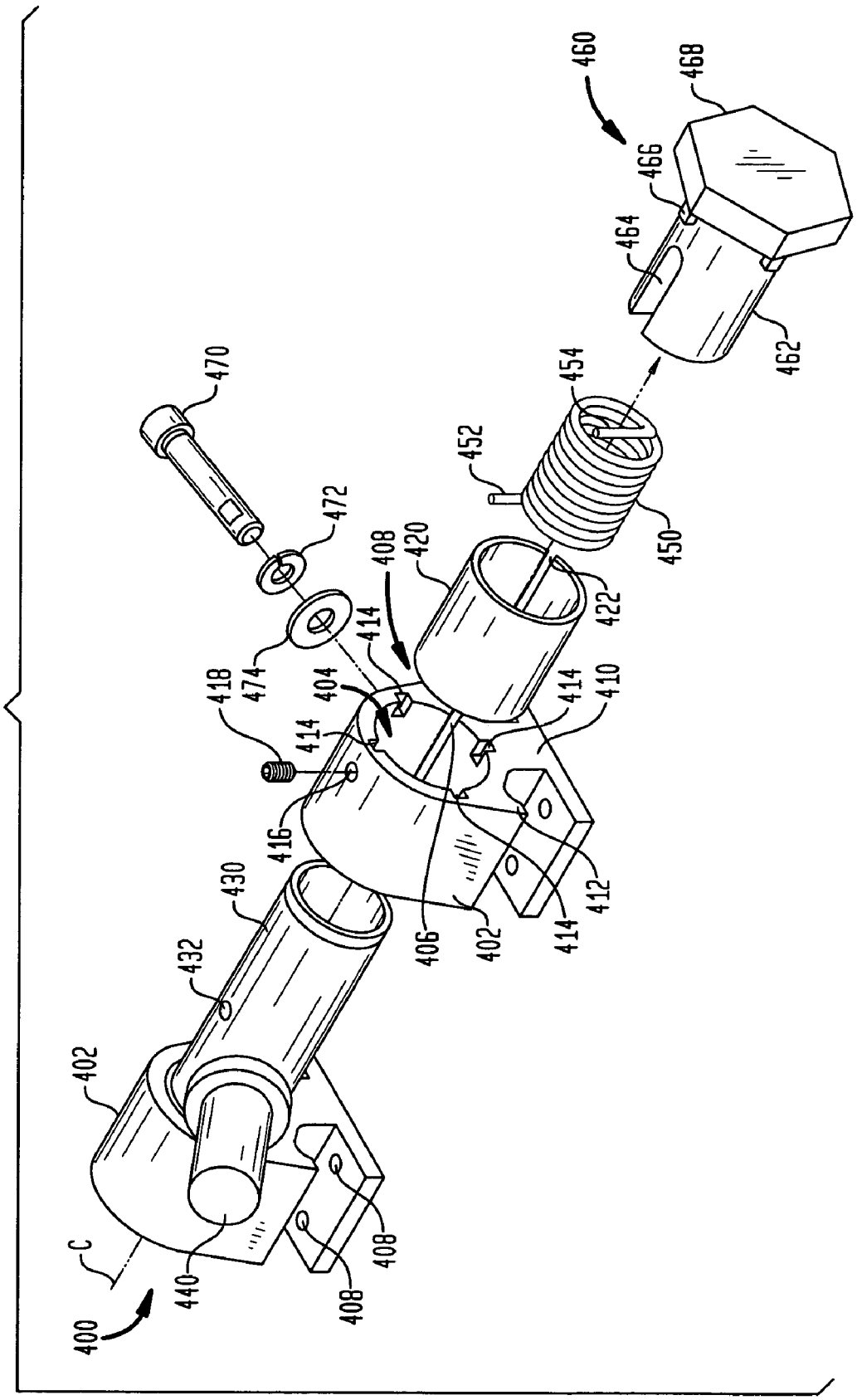
FIG. 10 is an exploded assembly drawing of a torsional tilter assembly in accordance with another embodiment of the invention.

In an alternate embodiment shown in FIG. 10, a tilter assembly 400 is provided having an internal torsion spring to achieve the same result as the external springs 352 and the tilter arm 350. The tilter assembly 400 includes a tilter shaft holder 402, a bushing 420, a tilter shaft 430, an arm mount 440, a torsion spring 450, a tension mechanism 460 and a locking mechanism 470. The tilter shaft holder 402 may be affixed to the adapter plate 302 (FIGS. 6A-B) by the fasteners 324 inserted through the holes 320 in the adapter plate 302 and through holes 408 in a base portion of the tilter shaft holder 402. As shown in FIG. 10, two tilter shaft holders 402 engage the tilter shaft 430, which is rotatable about an axis C. In alternate embodiments, a single tilter shaft holder 342 may engage one or both ends of the tilter shaft 346. The tilter shaft holder(s) 402 is preferably a metal such as aluminum.

A shaft opening 404 is dimensioned so as to receive the bushing 420 and the tilter shaft 430 therein. A slot 406 is provided along the sidewall of the shaft opening 404. Preferably, the slot 406 extends the length of the shaft opening 404. A bore (not shown) preferably extends through a first flange 408 into a stem 410 of the tilter shaft holder 402, as with the bore 374 of the tilter shaft holder 342 (FIG. 8A). The tilter shaft holder 402 may include a second flange 412 opposite the first flange 408. The locking mechanism 470 is preferably a set screw, and the bore is preferably at least partly threaded to receive the set screw. The threads of the set screw may be coated with nylon to securely engage the set screw with the bore. Alternatively, the locking mechanism 470 may be any other mechanism, e.g., a clasp, hasp, latch or clamp, which performs the equivalent function to constrict rotation about the axis C. The tilter shaft holder 402 preferably includes one or more recesses 414 and a hole 416 for receiving the tension mechanism 460, as will be described below.

The bushing 420 includes a slot 422 provided along its sidewall. Preferably, the slot 422 extends the length of the sidewall of the bushing 420 such that the bushing 420 has a non-closed annular shape. The bushing 420 is preferably a metal such as bronze. The bushing 420 is inserted into the shaft opening 404. The slot 422 of the bushing 420 need not be aligned with the slot 406 of the tilter shaft holder-402. The tilter shaft 430 may then be inserted into shaft opening 404.

The arm mount 440 may be inserted into the channel 144 of the forearm extension 140 (FIG. 2). As seen in FIG. 10, the arm mount 440 may extend perpendicularly through the tilter shaft 430. Preferably both the arm mount 440 and the tilter shaft 430 are a metal such as aluminum. The arm mount 440 may be welded to the tilter shaft 430. When the arm mount 440 is securely attached to the forearm extension 140, the adapter plate 302 may be adjusted, rotating about the axis C until the electronic device is appropriately positioned. Then the locking mechanism 470 is engaged by, e.g., inserting the set screw into the bore and tightening to close the slot 406 and the slot 422 to restrict rotation about the axis C. A lock washer 472 and/or a protective washer 474 may separate the head of the set screw from the tilter shaft holder 402.

The torsion spring 450 preferably includes a first tang 452 and a second tang 454. The torsion spring 450 is so dimensioned as to be insertable into the tilter shaft 430. The tilter shaft 430 preferably includes a hole 432 to receive the first tang 452 in order to secure one end of the torsion spring 450. After the torsion spring 450 is inserted into the tilter shaft 430, the tension mechanism 460 may be applied.

The tension mechanism 460 preferably includes a body 462, a recess 464, one or more bosses 466 and a cap 468. The body 462 is insertable into the interior of the torsion spring 450, and the recess 464 receives the second tang 454. Before fully inserting the tension mechanism 460, the torsion spring 450 may be pre-tensioned to achieve a desired torque preload value by partly inserting the tension mechanism 460 and rotating it about the axis C. Preferably, the cap 468 is hex-shaped so that a user may employ a conventional hex wrench to pre-tension the torsion spring 450. After pre-tensioning, the tension mechanism 460 may be fully inserted so that the bosses 466 securely engage the recesses 414. Preferably, the recesses 414 and the bosses 466 are square-shaped. Upon full insertion of the tension mechanism 460, the cap 468 securely maintains the torsion spring 450 within the shaft opening 404. The tension mechanism 460 may be secured by, for example, a retaining screw 418 or other device inserted into the hole 416 of the tilter shaft holder 402 to engage the recess 464.

The torsion spring 450 provides a counterbalance or bias to ensure that a heavy and/or bulky electronic device does not cause the adapter plate 302 to rotate about the axis C even though the locking mechanism 470 is engaged. The torsion spring 450 may be selected depending upon the weight of the electronic device attached to the adapter plate 302. The torsion spring 450 is preferably made from steel spring wire.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A tilting device, comprising:
an adapter plate adapted for attaching to a user device; and
a tilter assembly including:
a tilter shaft holder coupled to the adapter plate and having a first opening therein, the first opening being aligned along an axis;
a shaft received within the first opening, the tilter shaft holder being rotatable about the axis and rotatable relative to the shaft;
an arm mount coupled to the shaft and adapted to engage a support for supporting the tilting device during use;
a tilter arm having a first end coupled to the shaft and a second end remote from the first end; and
a spring having a first end directly connected to the adapter plate and a second end directly connected to the second end of the tilter arm, the spring being operable to provide counterbalance to the user device and to restrict rotation of the user device, the adapter plate and the tilter shaft holder relative to the shaft and the arm mount.

2. The tilting device of claim 1, wherein the spring comprises a plurality of springs connecting the adapter plate to the second end of the tilter arm.

3. The tilting device of claim 2, wherein at least one of the plurality of springs is removable to adjust the counterbalance for the user device.

4. A tilting device, comprising:
an adapter plate adapted for attaching to a user device; and
a tilter assembly including:
a tilter shaft holder coupled to the adapter plate and having a first opening therein, the first opening being aligned along an axis;
a shaft received within the first opening, the tilter shaft holder being rotatable about the axis and rotatable relative to the shaft;
an arm mount coupled to the shaft and adapted to engage a support;
a tilter arm having a first end coupled to the shaft and a second end remote from the first end; and
a spring having a first end connected to the adapter plate and a second end connected to the second end of the tilter arm, the spring being operable to provide counterbalance to the user device and restrict rotation of the user device, the adapter plate and the tilter shaft holder relative to the shaft and the arm mount;
wherein the arm mount is inserted through the shaft substantially perpendicular to the axis.

5. A tilting device, comprising:
an adapter plate adapted for attaching to a user device; and
a tilter assembly including:
a tilter shaft holder coupled to the adapter plate and having a first opening therein, the first opening being aligned along an axis;
a shaft received within the first opening, the tilter shaft holder being rotatable about the axis and rotatable relative to the shaft;
an arm mount coupled to the shaft and adapted to engage a support;
a tilter arm having a first end coupled to the shaft and a second end remote from the first end;
a spring having a first end connected to the adapter plate and a second end connected to the second end of the tilter arm, the spring being operable to provide counterbalance to the user device and restrict rotation of the user device, the adapter plate and the tilter shaft holder relative to the shaft and the arm mount;
a locking mechanism for engaging the tilter shaft holder and adapted to restrict rotation about the axis.

6. The tilting device of claim 5, wherein the locking mechanism is a set screw adapted to threadedly engage the tilter shaft holder.

7. The tilting device of claim 1, further comprising a bushing received within the first opening in the tilter shaft holder, the bushing receiving the shaft therein.

8. A tilting device, comprising:
an adapter plate adapted for attaching to a user device; and
a tilter assembly including:
a tilter shaft holder coupled to the adapter plate and having a first opening therein, the first opening being aligned along an axis;

a shaft received within the first opening, the tilter shaft holder being rotatable about the axis and rotatable relative to the shaft;

an arm mount coupled to the shaft and adapted to engage a support;

a tilter arm having a first end coupled to the shaft and a second end remote from the first end;

a spring having a first end connected to the adapter plate and a second end connected to the second end of the tilter arm, the spring being operable to provide counterbalance to the user device and restrict rotation of the user device, the adapter plate and the tilter shaft holder relative to the shaft and the arm mount;

a bushing received within the first opening in the tilter shaft holder, the bushing receiving the shaft therein; and a set screw adapted to threadedly engage the tilter shaft holder and restrict rotation about the axis, wherein the tilter shaft holder and the bushing each have a slot disposed along the axis, and when the set screw fully engages the tilter shaft holder both the tilter shaft holder slot and the bushing slot are compressible to restrict rotation about the axis.

9. The tilting device of claim 8, wherein the tilter shaft holder slot extends the entire length of the tilter shaft holder.

10. The tilting device of claim 8, wherein the bushing slot extends the entire length of the bushing.

11. The tiling device of claim 7, wherein the tilter shaft holder comprises a pair of tilter shaft holders, and the bushing includes a pair of bushings received within the pair of tilter shaft holders.

12. The tilting device of claim 11, wherein a first one of the pair of tilter shaft holders is disposed at a first end of the shaft and a second one of the pair of tilter shaft holders is disposed at a second end of the shaft.

13. The tilting device of claim 7, further comprising a retaining ring adapted to engage an end of the bushing and to prevent movement of the bushing along the axis.

14. The tilting device of claim 13, further comprising a cap engaging an end of the tilter shaft holder and covering the retaining ring and the bushing.

15. The tilting device of claim 1, further including at least one screw coupling the tilter shaft holder to the adapter plate.

16. The tilting device of claim 1, wherein the second end of the tilter arm is angled so that the tilter arm does not interfere with action of the spring.

17. The tilting device of claim 16, wherein the second end of the tilter arm is J-shaped.

18. A tilting device, comprising:
an adapter plate for attaching to a user device;
a tilter shaft holder coupled to the adapter plate and having an opening aligned along an axis;
a shaft received within the opening, the tilter shaft holder being rotatable about the axis and rotatable relative to the shaft; and
a spring device in operative relation to the shaft and the adapter plate, wherein the spring device is adapted to provide counterbalance to the user device and restrict rotation of the user device, the adapter plate, and the tilter shaft holder relative to the shaft, wherein the spring device is received substantially entirely within the shaft.

19. The tilting device of claim 18, further comprising a bushing received within the opening, the bushing receiving the shaft therein.

20. A tilter assembly for counterbalancing a user device, comprising:
a tilter shaft holder having a first opening aligned along an axis;
a shaft adapted to be coupled to a support for supporting the tilting device during use, the shaft received within the first opening, the tilter shaft holder being rotatable about the axis and rotatable relative to the shaft; and
a spring device in operative association with the shaft for counterbalancing the user device when attached to the tilter assembly and for restricting rotation of the user device and the tilter shaft holder relative to the shaft;
wherein the spring device comprises:
a tilter arm having a first end coupled to the shaft and a second end remote from the first end, the tilter arm being adapted to rotate about the axis upon rotation of the shaft;
a spring of the spring device having a first end operatively coupled to the user device and a second end directly connected to the second end of the tilter arm.

21. The tilter assembly of claim 20, wherein the spring comprises a plurality of springs.

22. The tilter assembly of claim 21, wherein at least one of the plurality of springs is removable to adjust the counterbalance for the user device.

* * * * *